United States Patent [19]
Skidmore

[11] 3,742,093
[45] June 26, 1973

[54] METHOD OF SEPARATING AN INSOLUBLE LIQUID FROM POLYMER COMPOSITION

[75] Inventor: Richard H. Skidmore, Strafford, Pa.

[73] Assignee: Welding Engineers, Inc., Norristown, Pa.

[22] Filed: Apr. 8, 1970

[21] Appl. No.: 26,622

[52] U.S. Cl. ...... 260/893, 260/94.9 GA, 260/880 R, 260/892, 210/71, 264/349
[51] Int. Cl. ........................ C08f 41/12, B29b 1/04
[58] Field of Search ............................ 264/86, 349; 260/892, 893; 100/93 S, 117; 259/8; 210/71

[56] References Cited
UNITED STATES PATENTS 2,935,763   5/1960   Newman et al. .................... 260/892
3,070,836   1/1963   De Haven et al. .................. 264/349

Primary Examiner—James A. Siedleck
Attorney—Paul and Paul

[57] ABSTRACT

Apparatus and method for separating a substantially insoluble liquid from a mixture containing a polymer or polymer mixture. The liquid is a vapor at the usual temperature and pressure of the polymer extrusion operation and is kept in liquid form by providing a high pressure region in the extruder. A liquid outlet is provided upstream of the high pressure region and the liquid is maintained under pressure and taken off as a liquid. The pressure-maintaining means may be a liquid outlet provided with a pressure control valve, trap or the like.

14 Claims, 4 Drawing Figures

Patented June 26, 1973

INVENTOR.
Richard H. Skidmore

BY

Paul & Paul

ATTORNEYS.

Patented June 26, 1973　　　3,742,093

INVENTOR.
Richard H. Skidmore
BY
*Paul + Paul*
ATTORNEYS.

METHOD OF SEPARATING AN INSOLUBLE LIQUID FROM POLYMER COMPOSITION

BACKGROUND OF THE INVENTION

Twin screw extruders in which a mixture of plastic materials is worked at elevated temperature and pressure are well known. One example is disclosed in the U.S. Pat. to Skidmore No. 3,082,816, granted Mar. 26, 1963. The system of the Skidmore patent separates solvent by vaporization. A high solvent temperature results from internally generated heat and from external heat supplied from a heating jacket surrounding the housing of the screw conveyor. Such apparatus has proven to be highly successful particularly in systems using solvents that are present in percentages of 60 percent or less and that have moderate heats of vaporization. However, in handling mixtures containing substantial quantities of water, which has a high latent heat of vaporization, it has been found that very large amounts of heat are necessary, resulting in the use of excessive temperatures which damage some polymers and which also produce high vapor velocities or require an excessive number of evaporative stages. Also, in view of limitations as to heat transfer rate, the material throughput rate must be reduced in order to allow sufficient time to heat the mixture, and this seriously curtails the productivity of the process.

The present invention is addressed to the problem of improving productivity produciivity and the economy of such apparatus and methods and does so by providing for the removal of non-solvent liquid which would tend to volatilize under the conditions of temperature and pressure used in the process, without transferring the latent heat of vaporization.

Briefly, the present invention is directed to an apparatus and method in which polymeric materials are mixed, worked, and conveyed by a screw conveyor through an elongated housing wherein a high pressure region is produced in the mixture at a point during its travel through the conveyor and a liquid is removed from the mixture upstream of this high pressure region, and wherein another high pressure region is provided upstream of the liquid removal point, which liquid has a relatively high latent heat of vaporization and would tend to volatilize under the conditions of temperature and pressure present in the apparatus. In accordance with this invention, the outlet means for removing this liquid from the apparatus includes a means for maintaining a high pressure on the liquid so as to maintain it in liquid form as it is withdrawn from the apparatus. A vent with a pressure control valve or the like may be used for this purpose. Thus, it is not necessary to furnish or to transfer heat to satisfy the latent heat of vaporization of the liquid.

In accordance with a preferred form of the invention, the liquid is deliberately introduced into the extruder at a point which is downstream of the one high pressure area but up-stream of the other high pressure area.

Throughout this specification and in the claims, where reference is made to "upstream" and "downstream," these terms are applied in relation to the direction of flow of the polymeric material in the extruder.

It has been found that the points of introduction and of removal of liquid may be so arranged that the liquid flow is either cocurrent or countercurrent with the flow of the polymeric material.

In any event, it is considered necessary to provide an upstream seal to confine the liquid against upstream escape from the extruder, and a downstream seal to confine the liquid in a manner to prevent its vaporization.

In one preferred form of the present invention the mixture of materials treated comprises an aqueous rubber emulsion and a polymer. Internally generated heat which results from mechanical working of the mixture, together with heat transferred from a steam or hot oil jacket, produce an elevated temperature in the material in the worm flights. Ordinarily, water separated from the mixture would vaporize at this temperature under atmospheric pressure. However, according to this invention, the liquid pressure maintaining means prevents the volatilization of the water which is removed from the mixture and that most or all of it remains liquid.

This invention may be better understood by reference to the following detailed description of the invention taken in conjunction with the accompanying drawings in which, FIG. 1 is a vertical sectional view of a typical apparatus embodying the present invention taken generally along the line I—I of FIG. 2;

Figure 1:
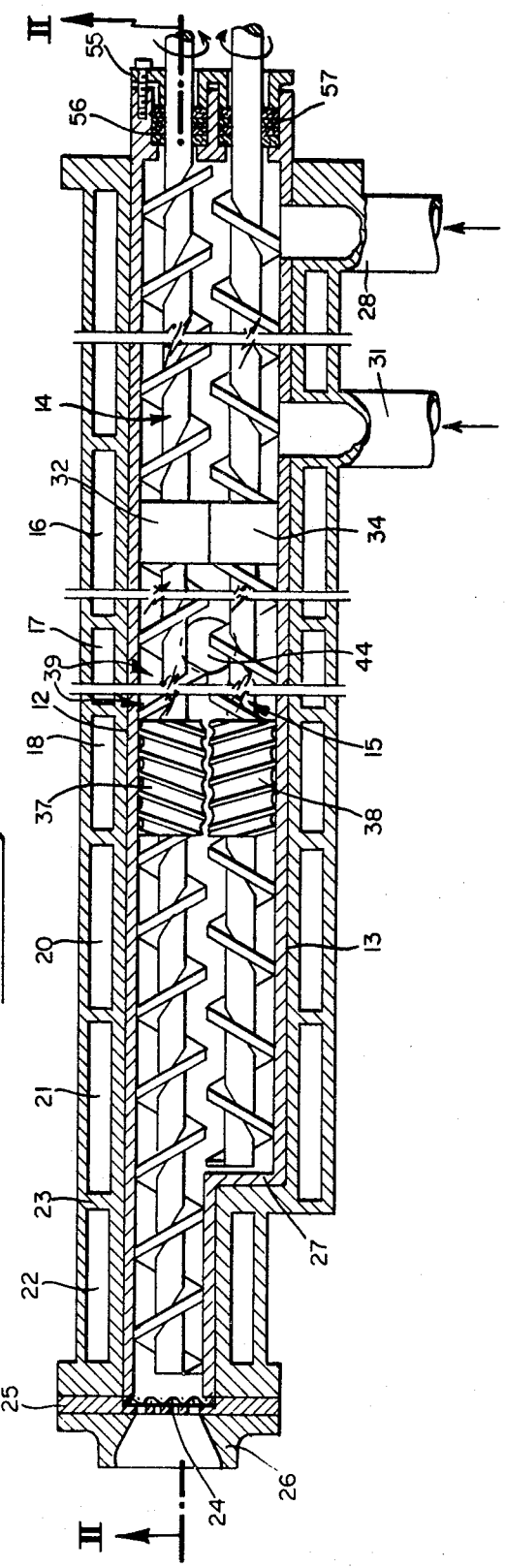
Figure 2:
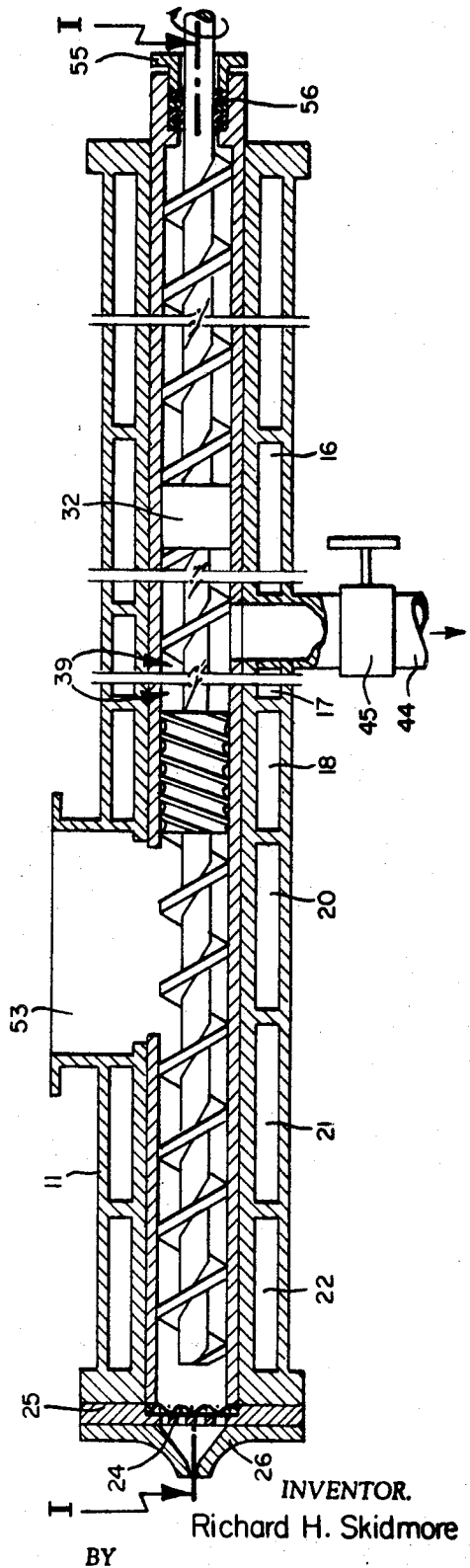
FIG. 2 is a plan view in central section of the apparatus appearing in FIG. 1, taken generally along the line II—II of FIG. 1.

Referring more specifically to FIGS. 1 and 2, there is shown a twin-screw extruder including a housing 11 having a pair of communicating barrels 12 and 13, with parallel adjacent feed worms 14 and 15 driven in rotation by a motor and gears (not shown) in directions indicated by the arrows at the right end of FIGS. 1 and 2, in such a way as to feed material disposed therein toward the left of the apparatus as illustrated.

A plurality of jacket sections 16, 17, 18, 20, 21 and 22 are provided, disposed about the barrels 12 and 13, for providing heat to material being worked within the barrels 12 and 13, such jacket sections being closed from one another by suitable annular ribs 23. It is also contemplated that the jacket sections may be used for providing cooling, when desired.

Screw sections 37 and 38 of feed worms 14 and 15 provide a high pressure region 39 in the mixture conveyed by worms 14 and 15 just upstream of screw sections 37 and 38. As illustrated, screw sections 37 and 38 comprise reverse pitch segments of worms 14 and 15. Alternatively, other means such as cylindrical segments with small radial clearances relative to the housing may be used to impede the flow of material past sections 37 and 38 and thereby produce the high pressure region 39 upstream thereof.

The rear ends of the worms 14 and 15 extend through a rear end plate 55 for driving the shafts in the desired directions. Packings 56 and 57 are provided for sealing the shafts of the worms 14 and 15.

The feed is introduced through inlets 28 and 31. Generally, at least one of the materials introduced through inlets 28 and 31 includes a liquid which would require a large amount of energy to vaporize, which liquid tends to volatilize at the pressure and temperature normally existing within the housing 11. In accordance with the present invention, this liquid is separated from the mixed material as these materials are mixed and worked by worms 14 and 15 and by a mixing section, shown as mixing cylinders 32 and 34 in FIGS. 1 and 2, as these materials approach the high pressure region 39 just upstream of screw sections 37 and 38, in which region 39 liquid is squeezed out of the solid material. This liquid material is then drawn off through liquid outlet 44. Outlet 44 is also provided with a back pressure valve 45 for controlling the pressure of the liquid withdrawn from housing 11 so as to prevent the volatilization thereof within the interior of the apparatus shown in FIGS. 1 and 2 thus eliminating the need to supply substantial amounts of heat.

Obviously, various means may be provided instead of valve 45.

Breaks are shown in FIGS. 1 and 2 in the lengths of apparatus between inlets 28 and 31, between inlet 31 and outlet 44 and between outlet 44 and reverse pitch screw segments 37, 38 to indicate that various other mixing, compounding and other sections may also be included, which are unrelated to this invention and which cannot conveniently be shown in these figures. Important details with respect to such arrangements will be described in further detail hereinafter.

The remainder of the apparatus shown in FIGS. 1 and 2, not previously described, includes an outlet 53 for volatiles and die 24 and nozzle 26, disposed at the outlet 25 of the housing 11. The worm 15 is shorter than the worm 14, and terminates just short of a wall 27, such that material conveyed through the housing 11 by the worm 15 is transferred over into the vicinity of the exit end of the worm 14, as viewed in FIG. 2, at a downstream end of the housing 11, just ahead of the end wall 27. It should be understood, of course, that these components, while generally used in apparatus of the type shown, are not essential to the present invention nor are they essential to apparatus and methods with which the present invention may be used.

Typically, the present invention is used to manufacture a rubber-polymer mixture, in which the rubber solids are introduced in the form of an aqueous emulsion (latex), and from which water is separated and removed as a liquid. Polystyrene, for example, is introduced through inlet 28 near the rear end of worms 14 and 15. As the polystyrene is worked, mixed and conveyed from right to left (with respect to the illustration in FIGS. 1 and 2), an aqueous emulsion, for example, dispersed particles of rubber in water, is introduced through inlet 31. The latex and polymer mixture is intimately combined and worked as it continues to move from right to left. In the high pressure region just upstream of worm segments 37 and 38, a significant portion of the water is squeezed from the water-rubber-polymer mixture which continues to travel forwardly (downstream) through worm segments 37 and 38. Thereafter, any remaining liquid is vaporized. The mixture is finally extruded through nozzle 26. The liquid separated from the mixture upstream of screw sections 37 and 38 is removed through liquid outlet 44 at a pressure controlled by valve 45 such that most or all of it remains liquid and thereby does not absorb its latent heat of vaporization.

In some cases, a polymer may include a constituent, such as residual monomer, which it is desirable to remove from the polymer and which may be extracted from the polymer by the liquid being separated in the apparatus. For example, water may extract residual styrene from polystyrene, further enhancing the purity of the product. As another example, water-soluble impurities such as salts may be extracted according to this invention.

The relative positions of the liquid outlet and the feed material inlets may be varied depending upon process conditions, materials being treated, and whether counter-current or concurrent movement of the separated liquid, with respect to the mixture. Accordingly, the liquid outlet 44 may be downstream of the inlets 28 and 31, upstream of the inlets or between them. It will be understood, of course, that the solid material introduced through inlets 28 and 31 will in all cases move generally from right to left while the liquid separated from this material may move in either direction depending on where, in the apparatus, it is separated and where it is removed from the apparatus.

Figure 3:
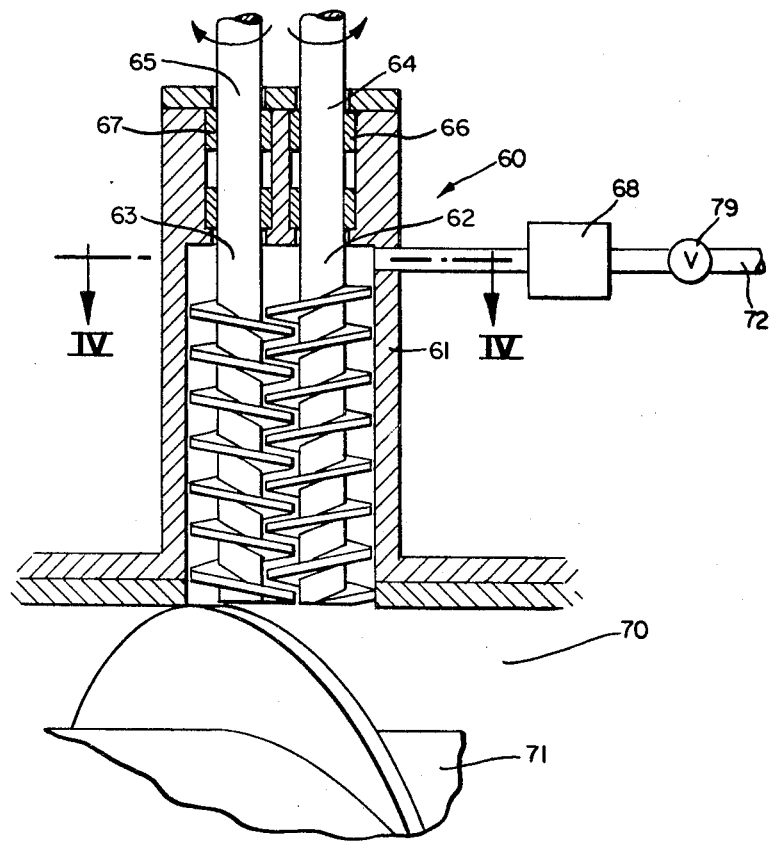
FIG. 3 is a vertical sectional view of an alternative liquid removal means provided with a fines-entrainment device in accordance with this invention.
Figure 4:
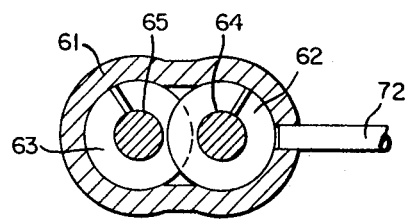
FIG. 4 is a horizontal sectional view of the apparatus of FIG. 3, taken generally along the line of IV—IV of FIG. 3.

Referring to FIGS. 3 and 4, an alternative embodiment of the liquid outlet is shown. A fluid outlet 60 comprising a casing 61 housing a screw conveyor (in this case a pair of intermeshed screw conveyor worms 62 and 63 are illustrated), rotated by a motor and gears (not shown) on suitable shafts 64 and 65 in a direction such as to prevent any solid materials from leaving the main apparatus housing 70. The pipe 72 is provided with a heat exchanger 68 and is discharged at 72 after passing through a pressure control valve 79 to an ambient pressure lower than that in the interior 70 of the apparatus at the point where the alternative outlet means 60 is in communication with the housing. It will be seen that a very slight clearance is provided between the peripheries of worm flights 62, 63 and the internal surfaces of the housing 61. Also, there is slight inter-flight clearance where the flights mesh. These clearances create a restricted passageway for the escape of high pressure liquid from the interior of housing 70 to vent 72, while restricting the entrainment of any solid particles.

The process according to this invention is highly advantageous in many ways. As stated, it is very advantageous when it is desired to introduce an ingredient into a polymer. The ingredient is one which can be suspended or otherwise incorporated into the liquid, but separates from the liquid (as by breaking an emulsion, for example) under the conditions of pressure, temperature and shear that exist within the extruder. The additive is uniformly physically worked and admixed into the polymer and the liquid is efficiently and economically separated from the resulting polymer mixture, even when large quantities of liquid are involved. One excellent example involves introducing an aqueous rubber suspension or emulsion which is normally stable at room temperature but which is unstable and breaks under the conditions of pressure, temperature and shear existing in the extruder, thus liberating the solid component from the water in the extruder, followed by mechanical admixing of the liberated solid component with the polymer. This separation can be promoted by adding coagulating agents in the same manner.

This invention is also highly advantageous for processing a substance such as a rubber species which has low resistance to heat or to oxidation, and which is normally difficult to dry, particularly in conventional equipment where the hot rubber is exposed to air. According to this invention, the rubber is mechanically admixed with the polymer in the extruder and they are concurrently dried in the extruder in the substantial absence of oxygen.

It is of particular advantage, for the purpose of removal of impurities from a polymer, to provide multiple zones wherein the liquid treatment step is applied in a zone, the liquid is removed and the resulting polymer mixture is mixed, agitated or worked in the extruder, and is then subjected to another similar liquid treatment in another zone. In some cases, even further treatments in additional successive zones are carried out. In each such case a material seal is provided between successive zones and the material is subjected to further working after the liquid has been removed and before further liquid is introduced. The nature or content of the liquid can, if desired, be changed from one zone to another.

The invention is highly advantageous for effecting the vigorous agitation of a polymer which is sensitive to the heat normally developed in such agitation. The viscosity of the polymer may be reduced by the controlled introduction of the liquid stream, controlling the temperature rise due to agitation, and the liquid used for such control is efficiently and economically removed.

This invention is also highly advantageous for adding a reactive chemical that reacts with polymer, for example in graft polymerization. Even in the event that the reactive chemical produces an exothermic reaction, it is entirely possible and practical according to this invention to remove the heat by adjusting the flow rate of the liquid added or its temperature, or the proportion of liquid to be vaporized as against another portion to be mechanically squeezed out under pressure. Vaporization, of course, produces a cooling effect, and the amount of vaporization can be readily controlled. For example, if it is desired to manufacture a cross-linkable material, the cross-linking agent can be combined with the polymer — polyethylene, for example. But in order to do this it is necessary to keep the polyethylene cool, and this invention has particular application to such a process because the cross-linking agent (either a liquid or a solid) can be incorporated with a non-solvent for the polymer either as a dispersion, suspension or emulsion, and such dispersion, suspension or emulsion breaks under the conditions existing within the extruder and the solid is intimately mixed mechanically with the polymer. The control of cooling can be obtained by adjusting the flow rate of the liquid, or its temperature, or by selectively vaporizing a portion, all as heretofore described.

This invention has particular advantage in the preparation of acrylonitrile-butadiene-styrene (ABS) mixtures or copolymers. According to one method, styrene and acrylonitrile are copolymerized separately from a rubber polymerization step, and the resulting rubber (together with residual liquids, from the reaction medium) is worked physically and intimately admixed with the styrene-acrylonitrile copolymer and its residual liquids. According to another method, improved ABS resin is made by polymerizing styrene and acrylonitrile in the presence of polybutadiene and this may be aqueous emulsion polymerization, aqueous suspension polymerization, bulk polymerization or solution polymerization in a solvent such as benzene, toluene, etc. In any such event, this invention is ideally adapted for the incorporation of polybutadiene latex into the copolymer system and for moving various undesirable materials (such as solvents, impurities, etc.) from the system.

It will be appreciated that various modifications may be made in accordance with this invention. For example, in some instances it may be desirable to preheat water when it is being used in a washing application according to this invention. Normally, when cold water is used and when the same water is expressed under pressure as hot water, the latent heat is saved but not the sensible heat. When the water is preheated in, for example, a preliminary superheater, the water is initially brought to the temperature and pressure at which it is intended to be discharged. In this manner, there is zero loss of heat in the process, due to the introduction and removal of water.

In addition, this invention provides an opportunity to introduce steam into the liquid containing portion for the purpose of removal of impurities or additional heating if desired.

Various other modifications may be made in this invention, including the substitution of equivalent elements and steps, the reversals of parts and of method steps, and the use of certain features independently of the use of other features, all without departing from the spirit and scope of this invention as defined in the appended claims.

The following is claimed:

1. A method of treating polymer in a worm extruder having a means for maintaining a high pressure region in said polymer at a predetermined location in said extruder, said polymer being present in a mixture containing a liquid to be removed therefrom, said polymer being substantially insoluble in said liquid, which liquid volatilizes under normal conditions of temperature and pressure at which said material is treated, said process comprising passing said polymer and liquid through said extruder causing said polymer and liquid to be worked in the course thereof, forming a high pressure region in said extruder, and removing said liquid upstream of said high pressure region at a pressure lower than that in the high pressure region but sufficiently high to prevent said liquid from volatilizing in said extruder.

2. The process defined in claim 1, wherein said polymer contains a residual component to be removed therefrom, which residual component is at least partially soluble in said liquid.

3. The process defined in claim 1, wherein said mixture contains an aqueous emulsion.

4. The process defined in claim 3, wherein said emulsion is a rubber latex.

5. The process defined in claim 1, wherein said polymer contains a residual component which is substantially insoluble in said liquid.

6. The method defined in claim 1, wherein said liquid is introduced under pressure into said extruder at a location upstream of said high pressure region and downstream of a seal.

7. A method of treating a polymer as recited in claim 1 and of introducing an ingredient into said polymer, said method comprising incorporating said ingredient into said liquid, introducing said liquid and ingredient under pressure into said extruder at a location upstream of said high pressure region and downstream of a seal, and separating the liquid thus introduced in the manner defined in claim 1.

8. The method of claim 3 wherein said aqueous emulsion is normally stable at room temperature but is unstable and breaks under the conditions of pressure and temperature existing in the extruder, thus liberating the solid component from the water in said extruder, whereby said liberated solid component is mechanically admixed with said polymer.

9. The method defined in claim 8 wherein said solid component is rubber.

10. The method defined in claim 8 wherein said aqueous emulsion is a latex containing a rubber which has a low resistance to heat or to oxidation, and which is accordingly normally difficult to dry, and wherein the rubber is formed into a mixture with said polymer and they are concurrently dried in said extruder in the substantial absence of oxygen.

11. Method of vigorously agitating a polymer which is sensitive to the heat normally developed by such vigorous agitation, reducing the viscosity of the polymer and controlling the temperature rise due to agitation by flooding the polymer with the liquid and removing the liquid by the process of claim 1.

12. The method defined in claim 1, wherein the liquid is in an aqueous emulsion of a second polymer, said second polymer containing butadiene as a primary constituent thereof.

13. The method defined in claim 12, wherein the liquid is in an emulsion which is initially stable at normal room temperature and pressure but which breaks in a manner to liberate said butadiene containing second polymer at a pressure and temperature higher than said room temperature and pressure.

14. The method defined in claim 13 wherein said butadiene-containing second polymer is polybutadiene and said polymer treated in a mixture therewith is a styrene-acrylonitrile copolymer.

* * * * *